United States Patent [19]

Reid et al.

[11] Patent Number: 4,978,275

[45] Date of Patent: Dec. 18, 1990

[54] COMPUTER CONTROLLED ARTICLE HANDLING DEVICE

[75] Inventors: Laurie M. Reid, Casselberry; Gary D. Hunt, Longwood, both of Fla.

[73] Assignee: Simplimatic Engineering Company, Lynchburg, Va.

[21] Appl. No.: 387,692

[22] Filed: Jul. 31, 1989

[51] Int. Cl.⁵ ............................................. B65G 57/14
[52] U.S. Cl. ............................. 414/789.5; 414/789.6; 414/752; 414/793; 414/791.6; 414/794.7; 414/796.9; 414/797; 271/103; 271/108; 198/419.1; 198/419.3
[58] Field of Search ................. 414/789.5, 789.6, 752, 414/793, 792.9, 791.6, 794.7, 796.9, 797; 198/419.1, 419.3; 271/103, 108

[56] References Cited

U.S. PATENT DOCUMENTS

| | | |
|---|---|---|
| 2,858,009 | 10/1958 | Bainbridge . |
| 3,027,020 | 3/1962 | McCoy . |
| 3,219,203 | 11/1965 | Jeremiah . |
| 3,389,810 | 6/1968 | Wolfe et al. . |
| 3,424,293 | 1/1969 | Deutschlander ................. 198/419.1 |
| 3,493,126 | 2/1970 | Forshier et al. . |
| 3,570,685 | 3/1971 | Carlson . |
| 3,612,299 | 10/1971 | Shaw . |
| 3,718,246 | 2/1973 | Dardaine et al. ................. 198/419.3 |
| 3,934,713 | 1/1976 | Van der Meer et al. . |
| 3,978,970 | 9/1976 | Reimers . |
| 4,041,677 | 8/1977 | Reid .............................. 198/419.3 X |
| 4,439,097 | 3/1984 | Mebus .......................... 414/794.3 X |
| 4,546,443 | 10/1985 | Oguchi et al. ..................... 901/20 X |
| 4,561,817 | 12/1985 | Spletzer et al. .............. 414/789.5 X |
| 4,565,478 | 1/1986 | Ericsson .......................... 414/79.3 X |
| 4,637,509 | 1/1987 | Raudat et al. ..................... 198/419.3 |
| 4,759,673 | 7/1988 | Pearce et al. ..................... 414/789.5 |
| 4,809,965 | 5/1989 | Vander Meer et al. ..... 414/789.5 X |

FOREIGN PATENT DOCUMENTS

| | | | |
|---|---|---|---|
| 2613337 | 10/1988 | France ................................. 414/752 |
| 0074825 | 4/1984 | Japan .............................. 414/789.5 |
| 190115 | 10/1984 | Japan .............................. 414/789.5 |
| 0262438 | 11/1986 | Japan ................................. 414/752 |
| 0104163 | 6/1964 | Norway .......................... 414/789.5 |
| 2205079 | 11/1988 | United Kingdom ............. 414/789.5 |

OTHER PUBLICATIONS

Noble Company, "Automatic Plate and Sheet Handling Systems", 1957.

Primary Examiner—Robert J. Spar
Assistant Examiner—William M. Hienz
Attorney, Agent, or Firm—St. Onge, Steward, Johnston & Reens

[57] ABSTRACT

An improved palletizer is provided for receiving successive groups of articles in a pattern forming area and transferring the groups in succession to a stacking area on a pallet. A servocontrolled sweep system transfers article groups from the pattern formings to the stacking area for stacking one group on top of the other as the pallet is indexed downward by a hoist system after each successive group, and a carriage system interleaves separator sheets between successive groups. A programmable logic controller controls the servocontrolled sweep system in accordance with a velocity characteristic designed to increase machine speed and efficiency.

13 Claims, 10 Drawing Sheets

COMPUTER CONTROLLED ARTICLE HANDLING DEVICE

FIELD OF THE INVENTION

The present invention relates to article handling equipment. More specifically, an improved palletizer is provided that uses a plurality of servocontrolled motors and a programmable logic controller to increase speed of operation.

BACKGROUND OF THE INVENTION

Article palletizers are well known in the art. See e.g., U.S. Pat. No. 3,934,713.

In general palletizers receive randomly placed articles such as upstanding containers en masse along a conveyor pathway, separate successive charges of articles from said mass, form the charge into an ordered group according to a pattern at a pattern forming area, and then sweep the charge further downstream to form a layer on a pallet. A separator sheet, usually of thin chipboard, is then placed over the charge, the pallet is indexed downward by a hoist a distance corresponding approximately to the height of the articles, and a next charge of articles is swept into place as the next layer. After n charges forming n layers are in place, a last separator sheet is placed on top and a top frame, usually of wooden construction, is placed on top. The loaded pallet may then be bound around its upper and lower edges to sufficiently stabilize the load for shipping and handling.

Such a prior art palletizer typically has at least three distinct subsystems: (1) a sweep subsystem for sweeping n successive charges of articles from the pattern forming area onto the pallet to stack up to n layers; (2) a carriage subsystem for retrieving not only chipboard sheets one at a time from a supply thereof and placing them one at a time in an interleaved fashion between the layers in said stack, but also for retrieving the top frame from a supply thereof and placing the top frame on the finished stack; and (3) a hoist subsystem for lifting the pallet up to alignment with the pattern forming area and then indexing the pallet back down one layer thickness at a time as successive layers are swept thereon. The three subsystems are typically controlled by routine motor control devices such as for example magnetic motor starters and variable frequency inverters such as an E-TRACK ® sold by TB Woods.

Such prior art palletizers can have substantial difficulty in attaining the speeds desirable in today's commercial environment. For example, such a palletizer may work reasonably well at 1,000 cans per minute, but at speeds approaching 1,400 cans per minute or higher, such a palletizer may become inadequate. If the machine components are strengthened with heavy duty materials, the inevitable increased weight can be counterproductive with respect to speed.

Also, prior art palletizers often use vacuum operated suction cups mounted on the carriage and operated with routine control circuitry to grasp the chipboard sheets for transfer to and placement on the stack one at a time. However, such suction cups can become clogged with debris and other contaminants over a period of use, thereby reducing their effectiveness and reliability. Such clogging problems become more pronounced as machine speed is increased.

Also, prior art palletizers typically use the carriage to retrieve the top frame from a supply thereof while a loaded pallet is being changed out in exchange for an empty pallet. The changeout time is used to pick up the top frame; however, the carriage will then carry the top frame along with the carriage back and forth while all n separator sheets are being placed. This procedure adds to the operating weight of the carriage and can reduce speed even further.

SUMMARY OF THE PRESENT INVENTION

In accordance with a preferred embodiment of the present invention, a prior art palletizer is improved by being provided with a programmable logic controller and three servocontrolled motors in place of the prior art motor control circuitry for controlling the sweep, the carriage, and the hoist in accordance with a program designed for improved speed of machine operation. In particular, the sweep is controlled in accordance with a velocity versus time characteristic that permits particularly reliable and efficient operation.

To further improve speed of operation, the carriage is controlled to refrain from picking up the top frame for placement on top of the nth layer of the fully loaded pallet, not during the pallet changeout portion of the cycle, but rather at some point much later in the loading cycle of the pallet, and preferably, the top frame is not retrieved until the separator sheet for the (n-−1)th layer has been placed. In this way, the effective operating weight of the carriage is reduced, and speed of carriage movement may be increased.

Additionally, the vacuum cup assembly for the carriage is equipped with a blow off control feature, wherein rather than simply reducing the vacuum to drop off the sheet, a positive pressure is introduced to the vacuum cups not only to blow off the sheet but also to purge the cup and blow out any debris that may have collected therein.

It is an object of the present invention to provide an improved palletizer having increased reliability and speed of operation.

Further objects and advantages of the present invention will become apparent from the following description of the drawings and the preferred embodiments.

DETAILED DESCRIPTION OF THE PREFERRED EMBODIMENT

Figure 1:
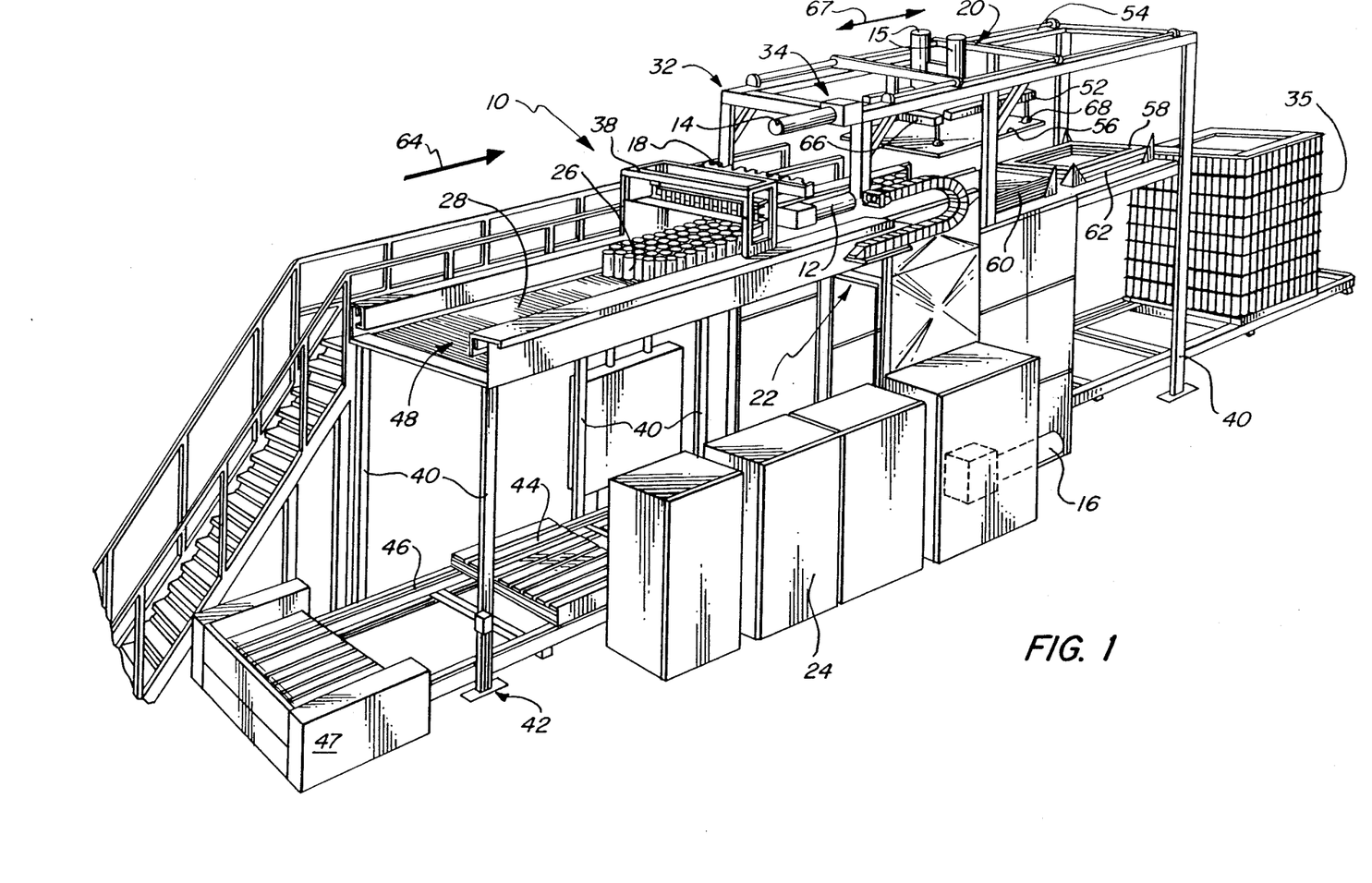
FIG. 1 is a perspective view of the improved palletizer of the present invention.

FIG. 1 shows generally at 10 the improved palletizer of the present invention, which is primarily a conventional palletizer with the addition of a programmable logic controller for operating the sweep subsystem 18, carriage subsystem 20, and hoist subsystem 22 respectively, in accordance with certain control programs as further described below; a blow off feature for placing the separator sheet by pressurizing the vacuum cup suction devices; and a generally lightweight construction where possible, such as for example a reduced weight carriage system.

Figure 5:
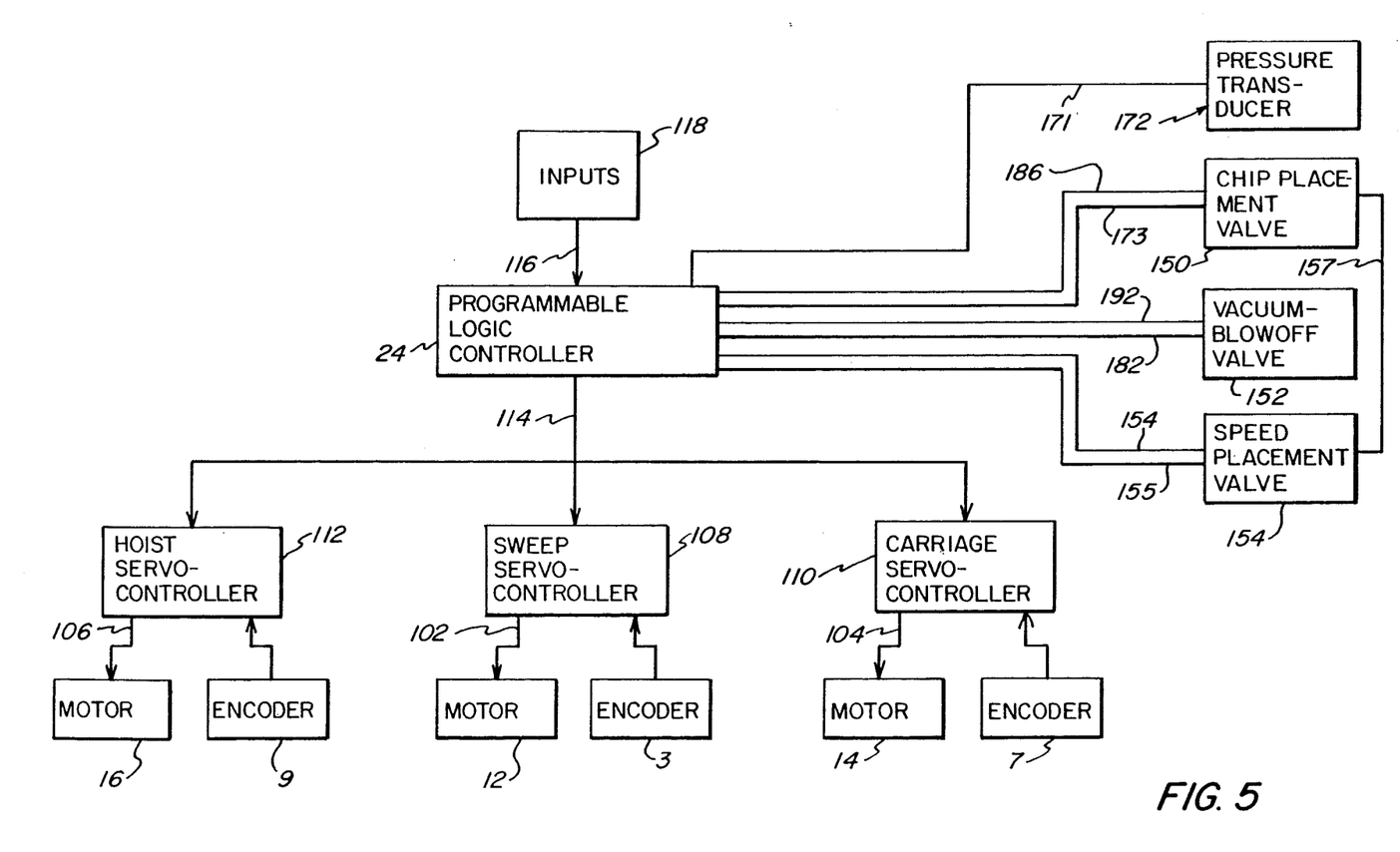
FIG. 5 is a block diagram of the servomotor control circuitry.

Servocontrolled motors 12, 14, and 16 are operatively coupled as shown in FIG. 5 to a programmable logic controller (PLC) 24 indicated only generally in FIG. 1.

With further reference to FIG. 1, articles such as upstanding cans or containers 26 are received from a source (not shown) on endless conveyor surface 28. Routine gating assembly 38 separates incoming en masse articles 26 into separate groups or charges in a conventional fashion.

Figure 2:
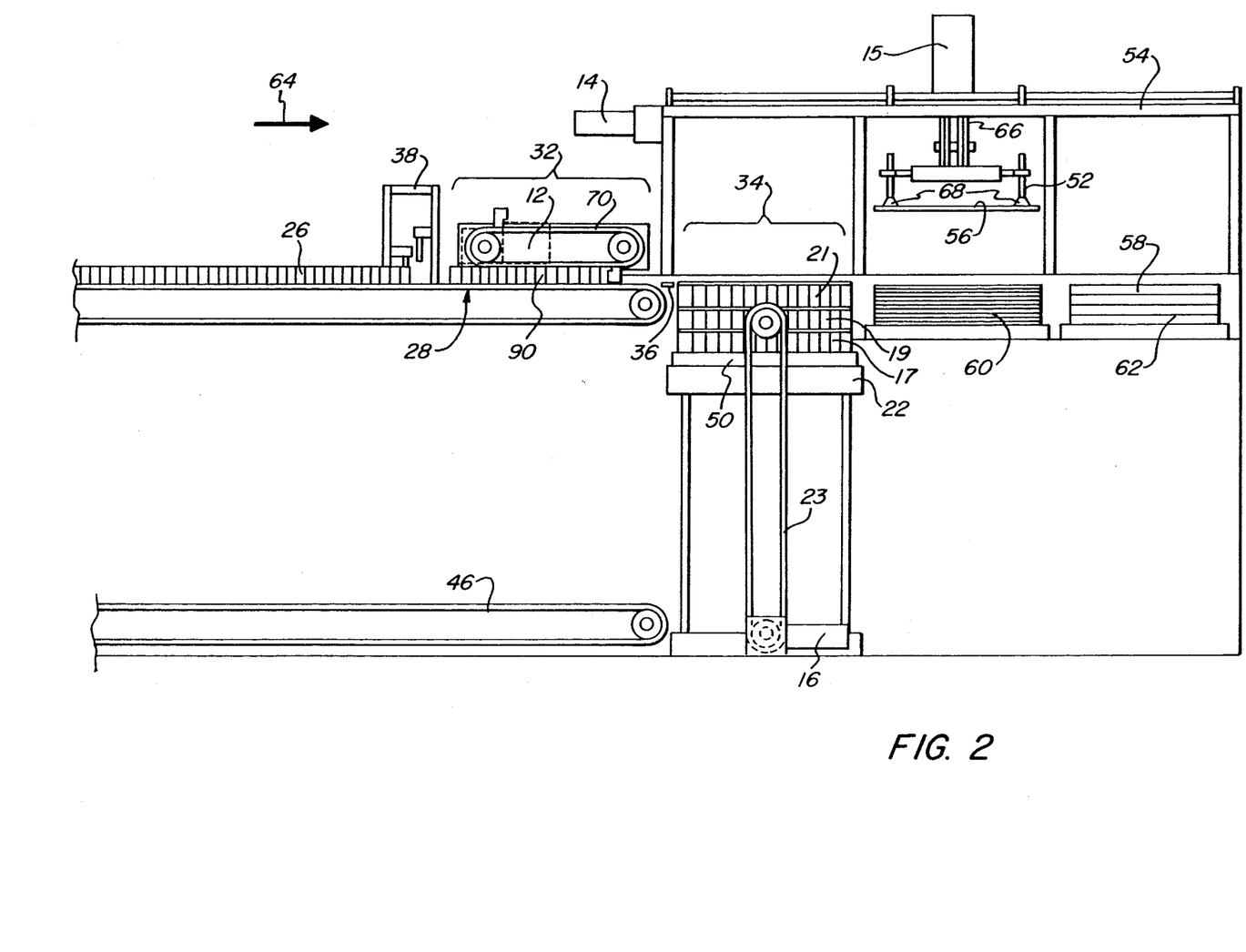
FIG. 2 is a side view schematic illustrating the operation of the improved palletizer of FIG. 1.

Frame members such as 40 support conveyor surface 28 at a height above the floor support 42 sufficient to permit stacking in a downwardly indexed direction at 34. Pallets such as at 44 are transported along track 46 from a supply 47 thereof to hoist 22 for elevation up to tin line 48, which corresponds generally to the conveyor surface 28. Sweep subsystem 18 sweeps successive charges of articles such as 17, 19, and 21 onto a pallet 50 on hoist 22 (see FIG. 2), while a carriage indicated generally at 52 moves back and forth under control of servomotor 14 along conventional track and linkage structure 54 as well as up and down on conventional support linkage 66 to retrieve and carry separator sheets such as 56 and top frame 58 from their respective supply stacks 60 and 62 thereof to stacking area 34. Hoist 22 is operated by servomotor 16 through conventional linkage indicated at 23, the details of which linkage provide no part of the present invention.

Arrow 64 illustrates the machine or downstream direction in which articles such as at 26 progress to reach pattern and stacking areas 32 and 34 respectively.

Carriage 52 is supported on framework 66 for up and down travel under control of conventional pneumatic piston assembly 15 and also includes vacuum suction cups 68 for use in grasping separator sheets one at a time from supply 60 thereof and carrying such sheets such as indicated at 56.

Loaded stacked pallets are output at 35.

Figure 3:
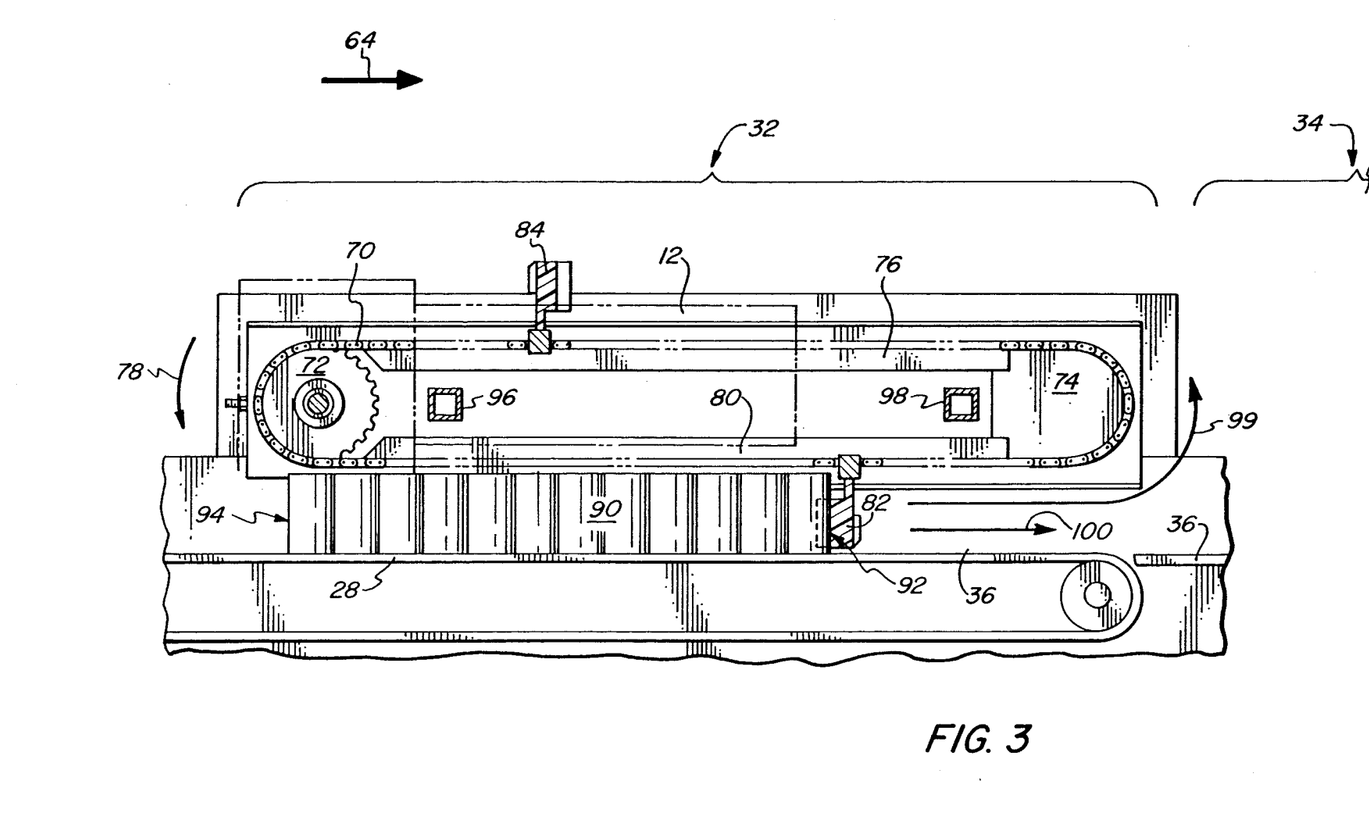
FIG. 3, is a side view schematic of the sweep sub system.
Figure 4:
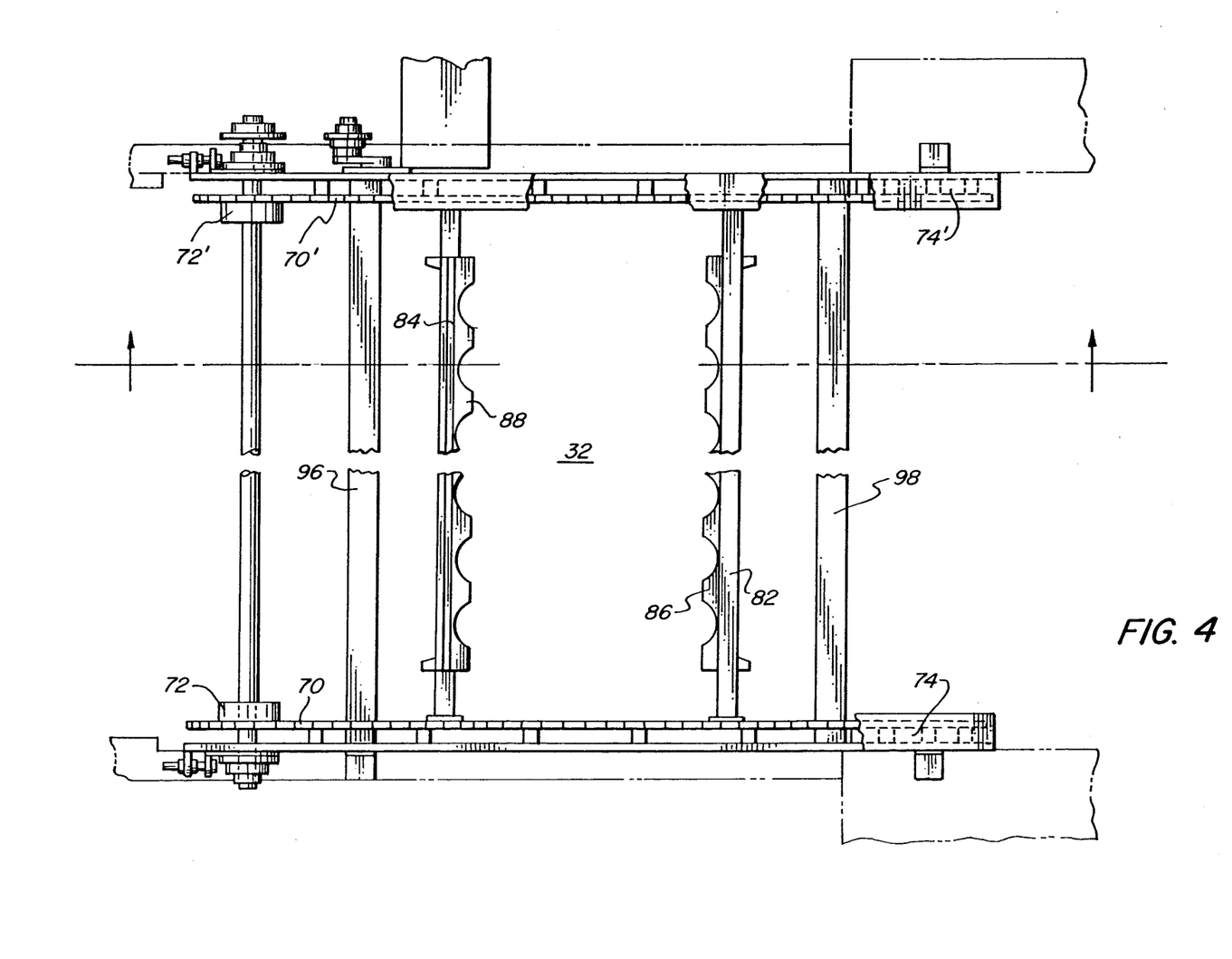
FIG. 4 is a top view schematic of the sweep subsystem of FIG. 3.

FIGS. 3 and 4 show the sweep mechanism of the preferred embodiment in more detail. Support means such as for example right and left endless chains 70, 70' are looped around corresponding sprockets 72, 72' and 74, 74' for travel around an endless path 76 in direction of arrow 78, said path 76 having a lower portion,. 80 generally aligned with and adjacent to conveyor surface 28 in the region of pattern forming area 32. Servomotor 12 is shown in phantom only to thereby more clearly reveal the other structure of the sweep system and is linked to sprockets 72, 72' by routine means not shown. Cross members 96 and 98 provide routine structural support in a cross-machine direction.

Article engaging means such as retainers 82 and 84 are affixed to chains 70, 70' and are spaced equidistant from each other around chains 70, 70'. Other numbers of retainers other than two could be used as well if chains 70, 70' were long enough. Retainers 82 and 84 have conventional pattern forming stops 86 and 88, which operate in a routine fashion to shape incoming articles into a patterned charge such as for example charge 90 shown in FIG. 3. Charge 90 has a leading or downstream-most edge 92 against retainer 82, which is here the front row retainer, and a trailing or upstream-most edge 94 and will constitute one layer when stacked onto the pallet.

When palletizer 10 is operational, conveyor 28 is continuously moving to continuously urge articles such as charge 90 downstream against front row retainer 82, which extends downwardly to engage leading edge 92 and temporarily restrain said charge 90 against further movement downstream.

When servomotor 12 through routine linkage not shown is controlled by PLC 24 to operate sprockets 72, 72' to move chains 70, 70' about endless path 76 in the direction of arrow 78, retainer 82 moves downstream and then up and out of the conveyor pathway in the direction of arrow 99 to be withdrawn from conveyor pathway 100 and thereby permit charge 90 to advance toward the pallet stacking area 34. Because it is also affixed to chains 70, 70', the other retainer 84 at the same time advances in the direction of arrow 78 to engage the trailing edge 94 and push the charge 90 further towards area 34. It is apparent that retainer 84 then becomes the next leading edge or front row retainer, and that the operation can be continuously repeated in a cyclical fashion as new charges are fed in succession into area 32 by gate 38. Accordingly it can be seen that, by developing the appropriate velocity profile versus time characteristic for servomotor 12 as will be discussed in additional detail below, the movement of articles through area 32 can be controlled to a desired extent.

FIG. 5 is a schematic block diagram showing the coupling of the servomotors 12, 14, and 16 along lines 102, 104, and 106 respectively to corresponding servocontrollers 108, 110, and 112, which are in turn controlled through link 114 by PLC 24. Encoders 3, 7, and 9 provide conventional feedback information. PLC 24 also controls the pneumatic piston assembly 15 and vacuum cups 68 through pressure transducer 172, chip placement valve 150, vacuum blow-off valve 152, and speed of placement valve 154 through lines 171; 186, 173; 192, 182; and 154, 155 respectively as explained in further detail below. It is understood that only those details of the control circuitry are shown as are necessary to explain the present invention. Other conventional features are not shown; for example, it is understood that PLC 24 receives routine inputs such as operator instructions and inputs from other routine transducer devices along line 116 from the inputs block 118.

In the preferred embodiment by way of example only, PLC 24 is a PLC 5; servocontrollers 108, 110, and 112 are a model 1391AA25; and motors 12, 14, and 16 are a model 1326B3E, all of which are manufactured by Allen Bradley.

Figure 6A:
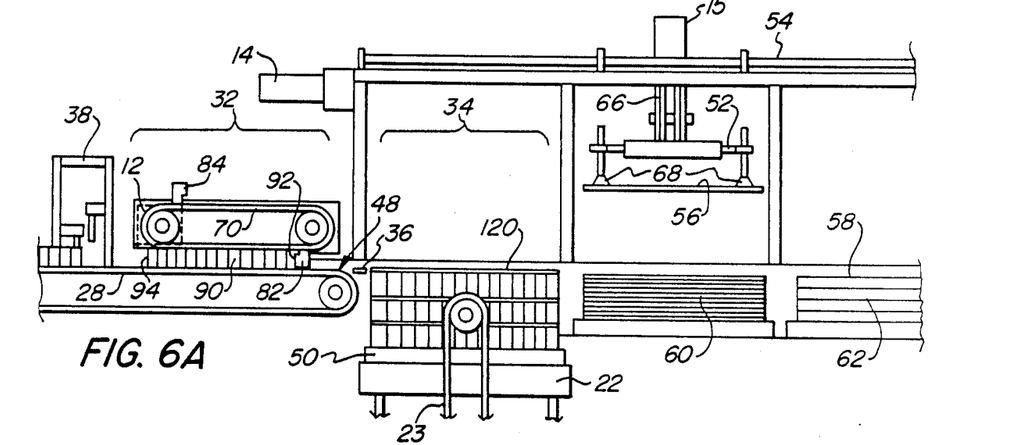
FIGS. 6A-6G are schematic diagrams depicting the operation of the improved palletizer of the present invention.
Figure 6B:
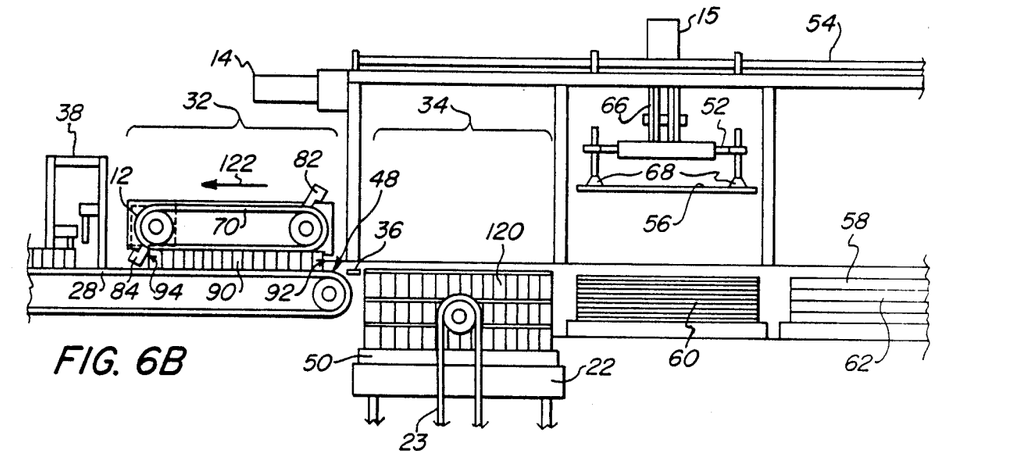
Figure 6C:
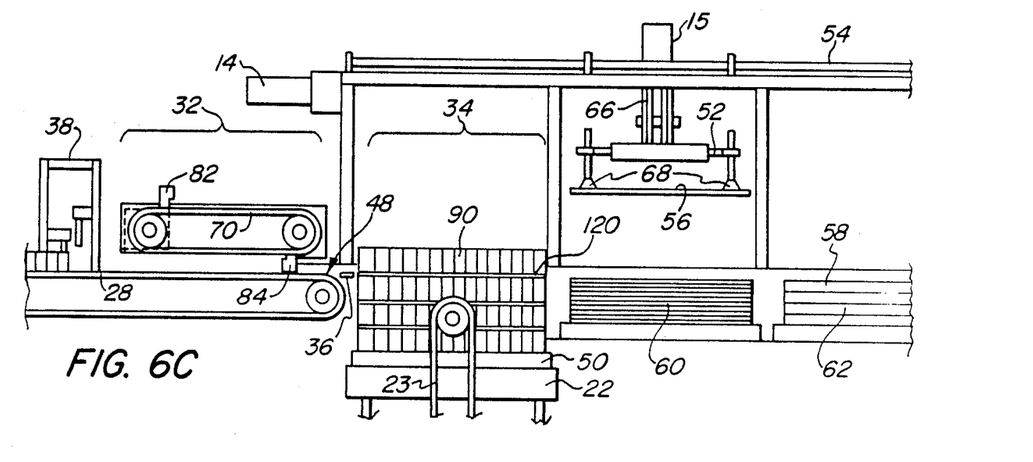
Figure 6D:
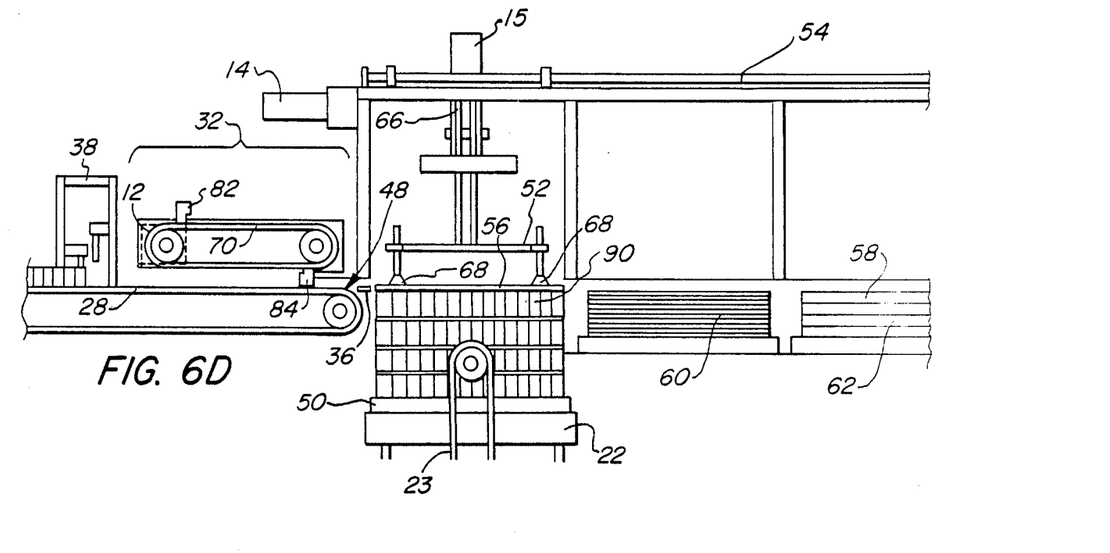
Figure 6E:
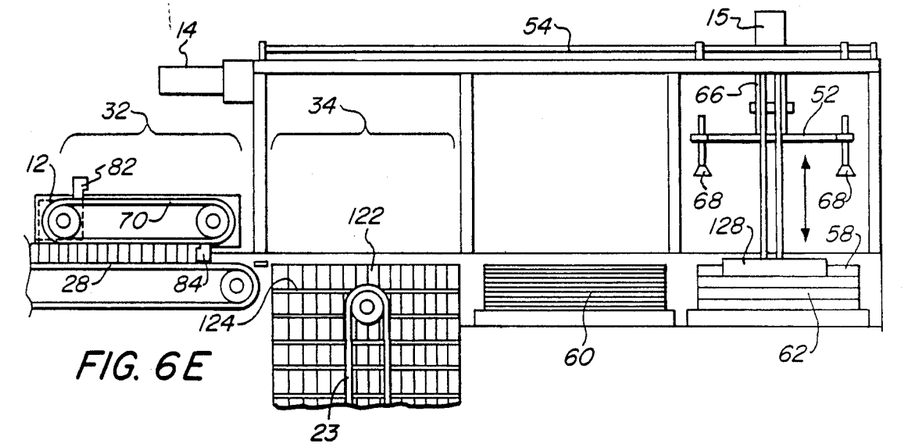
Figure 6F:
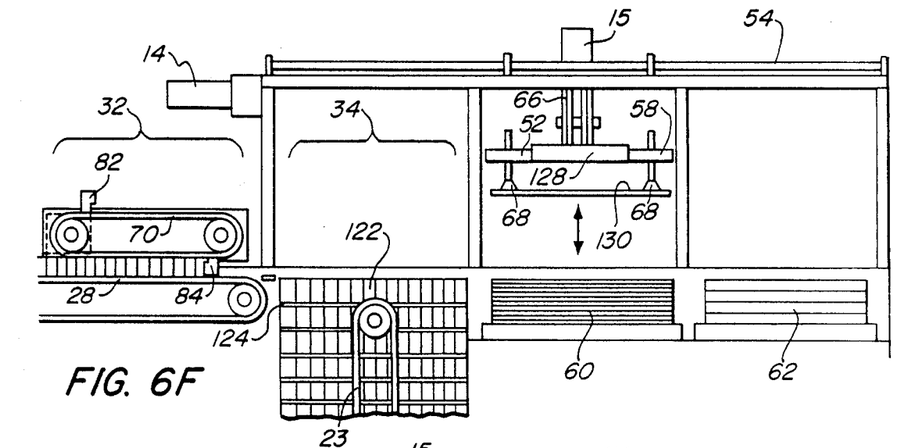
Figure 6G:
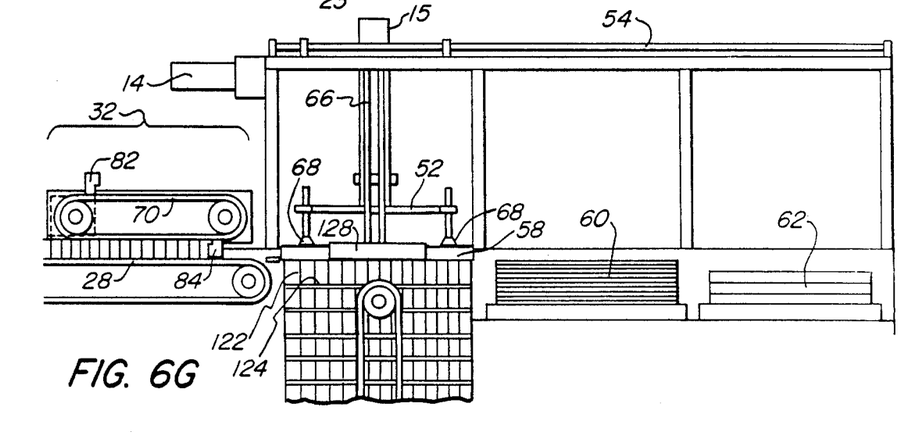
Figure 7:
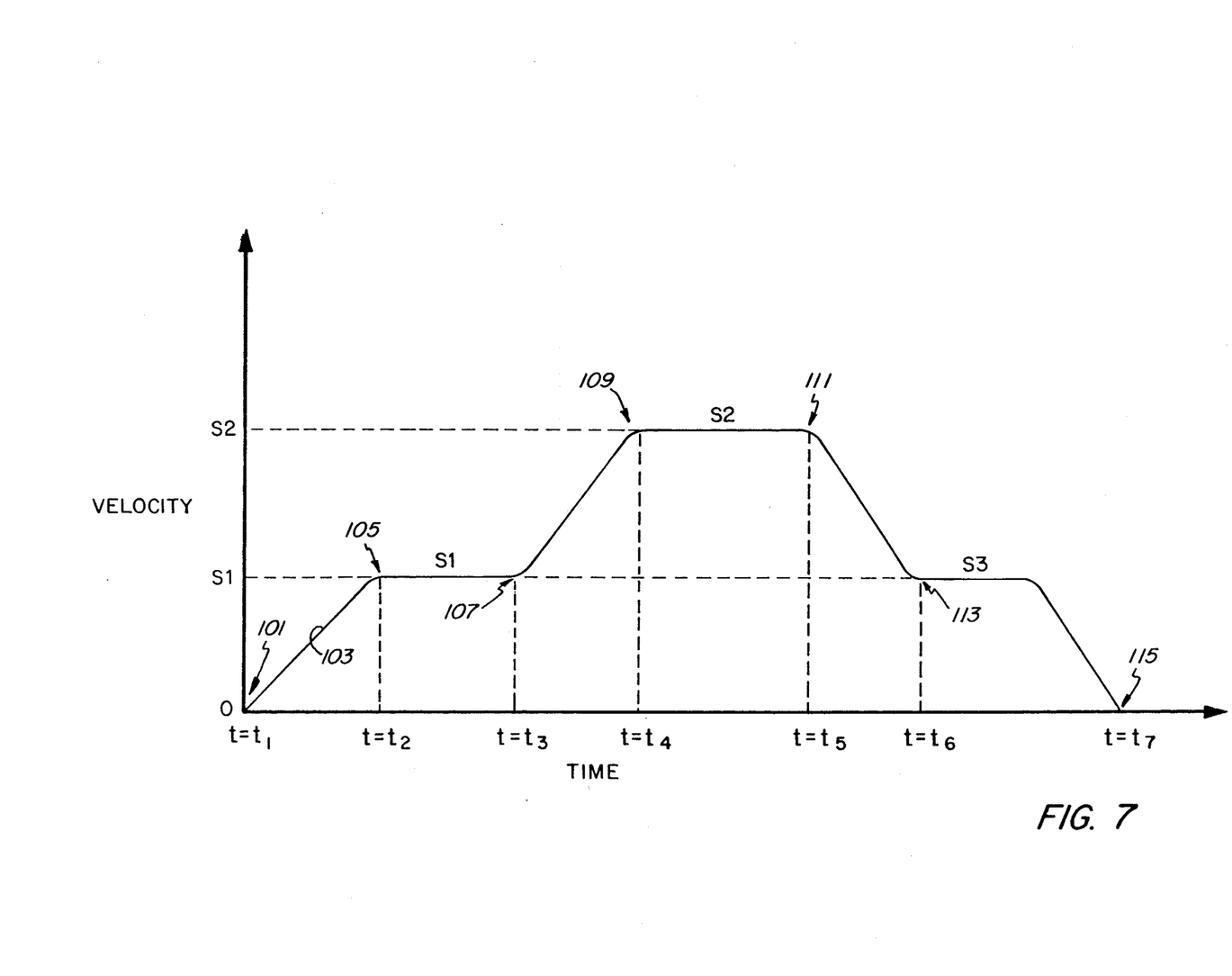
FIG. 7 is a velocity versus time curve for the sweep of the present invention.

FIGS. 6A-6G in conjunction with the velocity versus time curve characteristic of FIG. 7 further explain the operation of the palletizer 10 of the present invention from a side view perspective.

In FIG. 6A, which corresponds approximately to time $t=t_1$ at 101 on FIG. 7, charge 90 is being urged downstream by continuously moving conveyor 28, but is also being temporarily restrained by stationary front row retainer 82 which is stationary or has a velocity of 0 at $t=t_1$ to thereby restrain leading edge 92. Hoist 22 has previously been indexed downwardly by activation of servomotor 16 (see FIGS. 1 and 2) through conventional linkage 23 such that a previously placed separator sheet 120 is aligned with tin line 48, deadplate 36, and conveyor surface 28. Deadplate 36 provides a suitable bridge between the end of conveyor 28 and the loaded pallet 50, and may or may not be movable back and forth during each cycle of the operation in a conventional fashion. Carriage 52 has previously grasped a separator sheet 56 by being lowered by linkage 66 to place vacuum cups 68 in contact with the supply 60 of separator sheets and then activating cups 68 to grasp a sheet 56. Sheet 56 is thereby being held at the ready when carriage 52 is raised back in preparation for moving to position over the loaded pallet.

At FIG. 6B, servomotor 12 has been activated to move chain 70 at velocity S1 in direction of arrow 122 to thereby retract front row retainer 82 from the conveyor pathway and permit charge 90 to accelerate in a downstream direction under the influence of continuously moving conveyor 28 as indicated at point 103 on the velocity curve in FIG. 7. Speed S1 is then maintained in the time interval $t=t_2$ at 105 to $t=t_3$ at 107 in FIG. 7. S1, as well as the acceleration between $t=t_1$ and $t=t_2$, must have a magnitude sufficient to permit front row retainer 82 to retract and clear the oncoming top edges of the containers of leading edge 92 as they pass by underneath in response to the acceleration imparted to charge 90 by conveyor surface 28.

It can also be seen that the other retainer 84 approaches trailing edge 94 of charge 90 as chain 70 is so moved. Retainer 84 blends with the charge 90 at approximately speed S1 to avoid uncontrolled banging into trailing edge 94, and servomotor 12 is then accelerated to reach speed S2 at time $t=t_4$ at point 109 on the velocity curve of FIG. 7 to smoothly and reliably push the leading edge 92 over deadplate 36 or other typical threshold gap which joins conveyor surface 28 to the stacking area 34. S2 has a magnitude sufficient to push the charge 90 across deadplate 36 without being so great as to knock any of the articles in the leading edge 92 over. After the leading edge clears the gap at 36, velocity is reduced at time $t=t_5$ at point 111 on the curve of FIG. 7 to S3 at $t=t_6$ at 113 to smoothly complete the sweeping operation and decelerate the charge 90 for proper positioning on the pallet. S3 is approximately equal to S1, which is further approximately equal to machine speed SM.

After the transfer of charge 90 onto pallet 50 is complete, the velocity of chain 70 goes to zero at $t=t_7$ at 115. Chain 70 is also temporarily reversed to place retainer 84 in position for receiving a successive charge (see FIG. 6C), and the cycle will begin again with retainer 84 as the front row retainers this time when the successive charge is admitted by gate 38.

Next, servomotor 14 is activated to move carriage 52 to the left and piston 15 is also operated to move carriage 52 downwardly to place sheet 56 on top of group 90 by releasing vacuum cups 68 by blowing out as further described below (see FIG. 6D). Carriage 52 is then raised back up and returned to stack 60 for grasping the next separator sheet.

This process is repeated in a cyclical fashion until the (n−−1)th separator sheet 124 has been placed. Carriage 52 then travels under influence of servomotor 14 over to stack of top frames 62 and picks up a top frame 58 with conventional frame grasping means 128 that is also raised or lowered under influence of piston 15. Then, as shown in FIG. 6F, carriage 52 travels under influence of motor 14 to the stack of separator sheets 60, is lowered on linkage 66 by piston assembly 15, grasps the nth separator sheet 130, and then is raised by piston assembly 15. Then, as shown in FIG. 6G, the carriage 52 moves to stacking area 34 and is lowered to deposit sheet 130 and thereafter frame 58 on the pallet. By waiting until the last layer to pick up top frame 58, the effective operating weight of the carriage is reduced and speed can be increased. It is understood that, while it is preferred to wait until the (n−1)th separator sheet has been placed, it is also within the spirit of the present invention to pick up the top frame at a suitable earlier portion of the pallet loading cycle perhaps for example after the (n−2)th layer.

Figure 8:
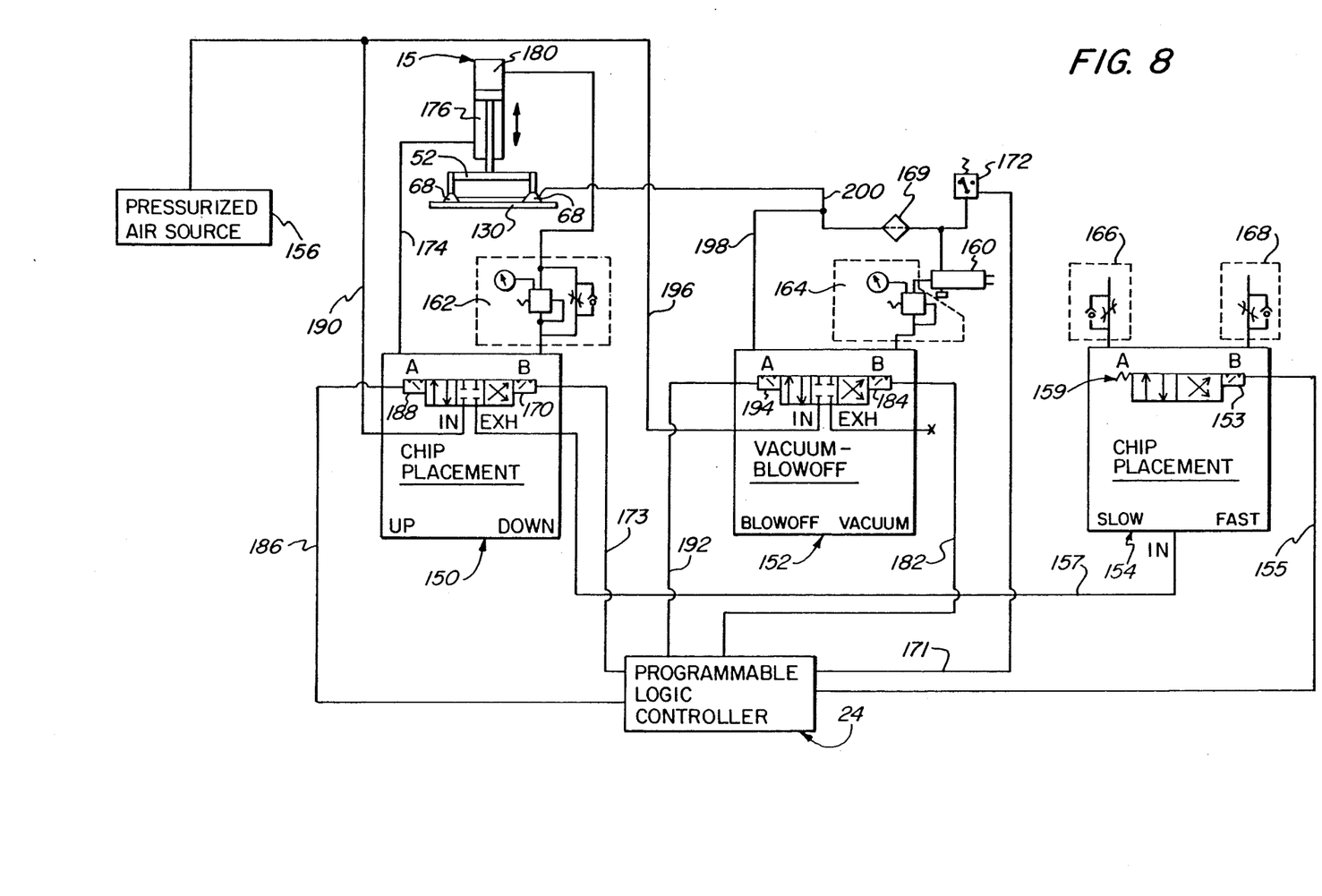
FIG. 8 is the pneumatic circuit diagram for the blow off feature of the present invention.

FIG. 8 illustrates part of the control circuitry for applying separator sheets to the stack, also referred to as chip placement. PLC 24 controls solenoid operated pneumatic valve 150 for chip placement, valve 152 for the vacuum cups 68, and valve 154 for speed of chip placement. Pressurized air source 156 provides a source of pressurized air preferably at approximately 60 p.s.i. for operation of pneumatic piston assembly 15 for raising and lowering the carriage 52 and also for blowing off vacuum cups 68. Vacuum pump 160 provides a source of vacuum for vacuum cups 68 along line 200. Components inside dotted lines 162 and 164 are routine regulating devices, the operation of which form no part of the present invention. Filter 169 filters the air from vacuum cups 68 to prevent ingestion of dirt and other contaminants from cups 68.

Device 172 is a pressure transducer for sensing vacuum and is employed in conjunction with the chip placement speed valve 154 as further described below. Exhaust line 157 from piston 15 and valve 150 exhausts through chip placement speed valve 154. If valve 154 is in position "A", the exhaust is through a relatively constricted port 166 and the carriage 52 moves in "slow" mode, while if in position "B" the exhaust is through a relatively unconstricted port 168 and the carriage 52 is in "fast" mode. When a separator sheet is being moved by the carriage either up from the supply stack 60 or down onto the loaded pallet at area 34, the carriage is in the "slow" mode to lessen the likelihood of shaking the sheet off. The PLC 24 monitors the presence of a sheet through pressure transducer 172 along line 171. When a sheet is being held by vacuum cups 68, transducer 172 will sense a vacuum and carriage operation is in the "slow" mode; otherwise carriage operation is in the "fast" mode.

The operation of the circuitry of FIG. 8 will now be explained in conjunction with references to FIGS. 6A–6G where appropriate.

FIG. 6F illustrates how a separator sheet or chip board is picked up from stack 60 thereof. When carriage 52 has been positioned by PLC 24 through motor 14 directly over stack 60 of separator sheets, PLC 24 activates electrical solenoid 170 through line 173 to move valve 150 to position "B" and thereby exhaust line 174 leading to side 176 of piston 15 while applying pressurized air from source 156 through line 178 to side 180 of piston 15, which in response lowers vacuum cups 68 into contact with sheet 130 on top of supply 60. Because no vacuum is being sensed by transducer 172, valve 154 is in the "fast" position or position "B" and carriage 52 travels downwardly in the "fast" mode. The carriage 52 can here move "fast" or at a relatively high rate of speed because no chipboard separator sheet is yet placed thereon.

PLC 24 then through line 182 activates solenoid 184 to shift valve 152 to "B" or the vacuum position, and a vacuum from vacuum source 160 is applied to cups 68 to cause sheet 130 to be grasped thereby. Transducer 172 thereupon senses the presence of a vacuum, and PLC 24 disengages solenoid 153 to permit valve 154 to return to the "A" or biased position under influence of spring means 159, thereby shifting the operation of carriage 52 to the "slow" or "A" position. The slower speed is desirable to avoid shaking the chipboard sheet off. Once a sheet 130 is so grasped, PLC 24 activates valve 150 through line 186 and solenoid 188 to reposition to position "A", thereby applying pressurized air from line 190 to line 174 and side 176 of piston 15, causing carriage 52 to be raised in "slow" mode back up to the position as shown in FIG. 6F.

Then, after servomotor 14 moves carriage 52 directly over stacking area 34, PLC 24 repositions valve 150 to the "down" or "B" position to lower carriage 52 and sheet 130 in "slow" mode into contact with the last charge on the stack. Then PLC 24 through line 192 activates solenoid 194 to reposition valve 152 to the "a" or "blowoff" position which admits pressurized air from source 156 along line 196 to cups 68 thereby not only releasing the sheet 130 in a positive fashion but also blowing out or clearing the vacuum cups 68 along lines 198 and 200 ahead of filter 169. Transducer 172 now no longer senses a vacuum and PLC 24 switches valve 154 back to the "fast" mode through line 155 and solenoid 153, since the separator sheet is no longer in place. Carriage 52 is then raised and repositioned over stack 60 for another cycle.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

We claim:

1. An article handling device for receiving groups of articles in a first area and transferring said groups in succession onto a second area on a load bearing member in a vertically stacked format, said device comprising;
   (a) means for sweeping successive groups of articles from said first area to said second area for stacking said groups one on top of the other onto said member mounted on a hoist and a servo-controlled motor for operating said sweeping means, said sweeping means including at least a pair of article engaging means for controlling movement of said groups from said first to said second area, a first one of said article engaging means for restraining movement of each said group from said first to said second area by engaging a leading edge of said group, and the second of said article engaging means for engaging a trailing edge of each said group and propelling said group from said first to said second area, both said article engaging means being mounted for travel on a support means around an endless path having one path portion aligned with said first area and a remaining path portion positioned away from said first area;
   (b) means for transporting separator sheets from a supply thereof to said second area for interleaving at least one sheet between said successive groups;
   (c) means for operating said hoist to index said hoist downward by a distance corresponding to the height of each group after each said group has been stacked on said member;
   (d) an endless conveyor surface corresponding to said first area for continuously urging said groups along a conveyor path from said first area towards said second area, said conveyor surface moving at a speed SM, and wherein said first and second article engaging means extend into said conveyor path;
   (e) a programmable means for controlling the operation of said servocontolled motor between at least two different nonzero speeds to stack said groups in accordance with a following predetermined protocol
   (i) move said support means at a speed S1 about equal to speed SM to move said first article engaging means out of said conveyor path and out of engagement with said group to thereby release said group for propulsion by said conveyor surface from said first to said second area, and
      (ii) after step (i), move said support means to move said second article engaging means further around said endless path into engagement with said trailing edge;
      (iii) after said engagement, accelerate said support means to speed S2 greater than S1 to propel at least said leading edge of said group onto said member; and
      (iv) decelerate said support means to speed S3 less than S2 to position said group on said member.

2. The device of claim 1, wherein said protocol further comprises (v) reverse said support means to retract said second article engaging means from said trailing edge and to position said first article engaging means into said conveyor path to restrain movement of a next group of said articles by engaging a leading edge of said next group.

3. The device of claim 1, wherein said articles are upstanding and said servocontrolled motor moves said support means at a speed sufficient to retract said first article engaging means from said engagement before continuous urging of said conveyor surface propels said edge further into subsequent engagement with said first article engaging means.

4. An article handling device for receiving groups of articles in a first area and transferring said groups in succession onto a second area on a load bearing member in a vertically stacked format, said device comprising:
   (a) means for sweeping successive groups of articles from said first area to said second area for stacking said groups one on top of the other onto said member mounted on a hoist and a servo-controlled motor for operating said sweeping means, said sweeping means including at least a pair of article engaging means for controlling movement of said groups from said first to said second area, a first one of said article engaging means for restraining movement of each said group from said first to said second area by engaging a leading edge of said group, and the second of said article engaging means for engaging a trailing edge of each said group and propelling said group from said first to said second area, both said article engaging means being mounted for travel on a support means around an endless path having one path portion aligned with said first area and a remaining path portion positioned away from said first area;
   (b) means for transporting separator sheets from a supply thereof to said second area for interleaving at least one sheet between said successive groups;
   (c) means for operating said hoist to index said hoist downward by a distance corresponding to the height of each group after each said group has been stacked on said member;

(d) an endless conveyor surface corresponding to said first area for continuously urging said groups along a conveyor path from said first area towards said second area, said conveyor surface moving at a speed SM, (e) a programmable means for controlling the operation of said servocontrolled motor between at least two different nonzero speeds to stack said groups in accordance with a following predetermined protocol:

(i) move said support means at a speed S1 about equal to speed SM to retract said first article engaging means;

(ii) after said first article engaging means is so retracted move said support means to move said second article engaging means into emgagement with said trailing edge;

(iii) after said engagement, accelerate said support means to speed S2 greater than S1 to propel at least said leading edge of said group onto said member; and (iv) decelerate said support means to speed S3 less than S2 to position said group on said member.

5. The device of claim 4, wherein said protocol further comprises (v) reverse said support means to retract said second article engaging means from said trailing edge and to position said first article engaging means into said conveyor path to restrain movement of a next group of said articles by engaging a leading edge of said next group.

6. The device of claim 4, wherein said first and second article engaging means extend into said conveyor path, and wherein said protocol further comprises:

in step (i), move said support means to move said first article engaging means out of said path portion to retract said first article engaging means from said conveyor path to permit said group to begin to be conveyed by said conveyor surface towards said second area; and in step (ii), after said first article engaging means is so retracted, further move said support means to move said second article engaging means further around said endless path and into said path portion to engage a trailing edge of said group and propel a leading edge of said group towards said second area and propel said group into final position on said member 7. The device of claim 6, wherein said articles are upstanding and said servocontrolled motor moves said support means at a speed sufficient to retract said first article engaging means from said engagement before continuous urging of said conveyor surface propels said leading edge further into subsequent engagement with said first article engaging means.

8. The device of claim 7, wherein said first area is a pattern forming area and said second area is a stacking area, and said first area is separated from said second area by a deadplate, and said servocontrolled motor means moves said second article engaging means at a speed sufficient to propel said articles over said deadplate in an upstanding condition after said first article engaging means is retracted.

9. An article handling device for receiving n groups of articles in a first area and transferring said groups in succession onto a second area on a load bearing member in a vertically stacked format, said device comprising:

(a) means for sweeping successive groups of articles from said first area to said second area for stacking said groups one on top of the other onto said member mounted on a hoist and a servocontrolled motor for operating said sweeping means;

(b) means for transporting separator sheets from a supply thereof to said second area for interleaving at least one sheet between said n successive groups stacked one on top of the other in the stacking area on said member to form a stack of n layers, said transporting means including a carriage for removing separator sheets one at a time from a supply thereof, for moving said sheets to said stacking area, and for depositing said sheets one at a time in a single sheet interleaved fashion between groups, said carriage further for removing a top frame one at a time from a supply thereof, for removing said frame to said stacking area, and for depositing said frame on the nth later after said separator sheet has been placed on said nth layer;

(c) means for operating said hoist to index said hoist downward by a distance corresponding to the height of each group after each group has been stacked on said member; and (d) programmable means for controlling the operation of said servocontrolled motor to stack said n groups in accordance with a predetermined protocol including controlling said carriage to remove the top frame from said supply thereof only after the separator sheet for an (n−1)th layer has been deposited on an (n−1)th group in said stack, and controlling said carriage to remove an nth separator sheet only after said carriage removes said top frame so that said carriage deposits both said nth separator sheet and said top frame after moving to said stacking area.

10. The device of claim 9, wherein said carriage further includes vacuum means for grasping each said separator sheet to remove said sheet from said supply thereof, said vacuum means including at least one vacuum cup in communication with a vacuum source for mating said cup with said sheet to grasp said sheet, said device further including control means for introducing an elevated air pressure to said vacuum cup to impel said sheet from said carriage onto said stack.

11. The device of claim 9, wherein said operating means comprises a third servocontrolled motor responsive to said programmable means for controlling the indexing of said stack.

12. The device of claim 9, wherein said transporting means further comprises:

(a) means for positioning at least one vacuum cup means adjacent a separator sheet in said supply;

(b) means for applying a vacuum to said cup means sufficient to cause said sheet to adhere thereto;

(c) means for moving said vacuum cup means to a position adjacent said stack; and (d) means for applying pressurized air to said cup means after said vacuum cup means is so positioned, whereby said sheet is urged off of said cup means towards said stack.

13. The device of claim 12, wherein said vacuum cup means is moved back and forth between said supply and said stack in a first direction with a selected one of said sheets adhered thereto and in an opposite direction for retrieving a next successive sheet after said selected one of said sheets has been placed on said stack, said device further including means for moving said vacuum cup means at a slower velocity in said first direction relative to said opposite direction.

* * * * *